United States Patent
Gu et al.

(10) Patent No.: US 12,093,718 B2
(45) Date of Patent: Sep. 17, 2024

(54) ACCELERATED LIFECYCLE MANAGEMENT IN HCI SYSTEMS

(71) Applicant: Dell Products L.P., Round Rock, TX (US)

(72) Inventors: Hanzhang Gu, Shanghai (CN); Jun Chen, Shanghai (CN); Charlie Chen, Shanghai (CN)

(73) Assignee: Dell Products L.P., Round Rock, TX (US)

( * ) Notice: Subject to any disclaimer, the term of this patent is extended or adjusted under 35 U.S.C. 154(b) by 259 days.

(21) Appl. No.: 17/719,643

(22) Filed: Apr. 13, 2022

(65) Prior Publication Data

US 2023/0305877 A1    Sep. 28, 2023

(30) Foreign Application Priority Data

Mar. 28, 2022 (CN) .......................... 202210314746.4

(51) Int. Cl.
*G06F 9/455* (2018.01)
*G06F 8/65* (2018.01)

(52) U.S. Cl.
CPC ............ *G06F 9/45558* (2013.01); *G06F 8/65* (2013.01); *G06F 2009/4557* (2013.01)

(58) Field of Classification Search
USPC ....................................................... 717/168
See application file for complete search history.

(56) References Cited

U.S. PATENT DOCUMENTS

| | | | | |
|---|---|---|---|---|
| 10,210,567 | B2 * | 2/2019 | Mick | G06Q 30/08 |
| 11,157,263 | B1 * | 10/2021 | Zhang | G06F 8/65 |
| 11,231,951 | B2 * | 1/2022 | Panse | G06F 8/65 |
| 2013/0179872 | A1 * | 7/2013 | Kuzmack | G06F 9/45533 |
| | | | | 717/173 |
| 2015/0277779 | A1 * | 10/2015 | Devarapalli | G06F 9/45558 |
| | | | | 711/162 |
| 2017/0180135 | A1 | 6/2017 | Hodroj | |
| 2019/0391835 | A1 * | 12/2019 | Gowda | G06F 9/45558 |
| 2020/0210272 | A1 | 7/2020 | Zhang et al. | |

OTHER PUBLICATIONS

Non-Final Office Action, U.S. Appl. No. 16/915,453, mailed Apr. 26, 2022, U.S. Patent and Trademark Office.

* cited by examiner

*Primary Examiner* — Qing Chen
*Assistant Examiner* — Clint Thatcher
(74) *Attorney, Agent, or Firm* — Jackson Walker L.L.P.

(57) ABSTRACT

An information handling system may include at least one processor and a memory. The information handling system may be configured to perform an upgrade of a plurality of hosts of an information handling system cluster by: determining a score for each host based on hardware metrics of each host; based on the determined scores, selecting a first host for upgrading; migrating virtual machines from the first host to one or more other hosts; and causing the first host to perform the upgrade.

20 Claims, 3 Drawing Sheets

ACCELERATED LIFECYCLE MANAGEMENT IN HCI SYSTEMS

TECHNICAL FIELD

The present disclosure relates in general to information handling systems, and more particularly to techniques for accelerating lifecycle management events in a cluster environment such as a hyper-converged infrastructure (HCI) cluster.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Hyper-converged infrastructure (HCI) is an IT framework that combines storage, computing, and networking into a single system in an effort to reduce data center complexity and increase scalability. Hyper-converged platforms may include a hypervisor for virtualized computing, software-defined storage, and virtualized networking, and they typically run on standard, off-the-shelf servers. One type of HCI solution is the Dell EMC VxRail™ system. Some examples of HCI systems may operate in various environments (e.g., an HCI management system such as the VMware® vSphere® ESXi™ environment, or any other HCI management system). Some examples of HCI systems may operate as software-defined storage (SDS) cluster systems (e.g., an SDS cluster system such as the VMware® vSAN™ system, or any other SDS cluster system).

In the HCI context (as well as other contexts), information handling systems may execute virtual machines (VMs) for various purposes. A VM may generally comprise any program of executable instructions, or aggregation of programs of executable instructions, configured to execute a guest operating system on a hypervisor or host operating system in order to act through or in connection with the hypervisor/host operating system to manage and/or control the allocation and usage of hardware resources such as memory, central processing unit time, disk space, and input and output devices, and provide an interface between such hardware resources and application programs hosted by the guest operating system.

HCI systems are typically upgraded periodically to take advantage of improvements and additional features of new versions of software and firmware, which is referred to as performing a lifecycle management (LCM) upgrade. As used herein, the term LCM refers to a process for upgrading components (e.g., software and/or firmware components) within a cluster of information handling systems.

When upgrading the HCI system, some resources, including computing, storage, and networking resources, may be temporarily inaccessible. Hence, it is desirable to reduce the time taken by upgrades.

Further, it is desirable to be able to conduct LCM upgrades without any downtime or interruption of service. In one embodiment, each host of an HCI cluster may be put into maintenance mode and removed from maintenance mode in a cyclic manner so that the data can still be accessible via the other hosts in the cluster. When a host enters maintenance mode, existing VMs are migrated to other hosts, and new VMs cannot be created until maintenance mode ends. After a host is upgraded and is taken out of maintenance mode, it may need a data resynchronization due to ongoing cluster input/output (I/O) that has occurred during its time in maintenance mode. This resynchronization prolongs the overall LCM time.

Accordingly, embodiments of this disclosure may provide techniques for reducing the time needed for LCM events.

It should be noted that the discussion of a technique in the Background section of this disclosure does not constitute an admission of prior-art status. No such admissions are made herein, unless clearly and unambiguously identified as such.

SUMMARY

In accordance with the teachings of the present disclosure, the disadvantages and problems associated with lifecycle management may be reduced or eliminated.

In accordance with embodiments of the present disclosure, an information handling system may include at least one processor and a memory. The information handling system may be configured to perform an upgrade of a plurality of hosts of an information handling system cluster by: determining a score for each host based on hardware metrics of each host; based on the determined scores, selecting a first host for upgrading; migrating virtual machines from the first host to one or more other hosts; and causing the first host to perform the upgrade.

In accordance with these and other embodiments of the present disclosure, a computer-implemented method for performing an upgrade of a plurality of hosts of an information handling system cluster may include: determining a score for each host based on hardware metrics of each host; based on the determined scores, selecting a first host for upgrading; migrating virtual machines from the first host to one or more other hosts; and causing the first host to perform the upgrade.

In accordance with these and other embodiments of the present disclosure, an article of manufacture may include a non-transitory, computer-readable medium having computer-executable instructions thereon that are executable by a processor of an information handling system for performing an upgrade of a plurality of hosts of an information handling system cluster by: determining a score for each host based on hardware metrics of each host; based on the determined scores, selecting a first host for upgrading; migrating virtual machines from the first host to one or more other hosts; and causing the first host to perform the upgrade.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
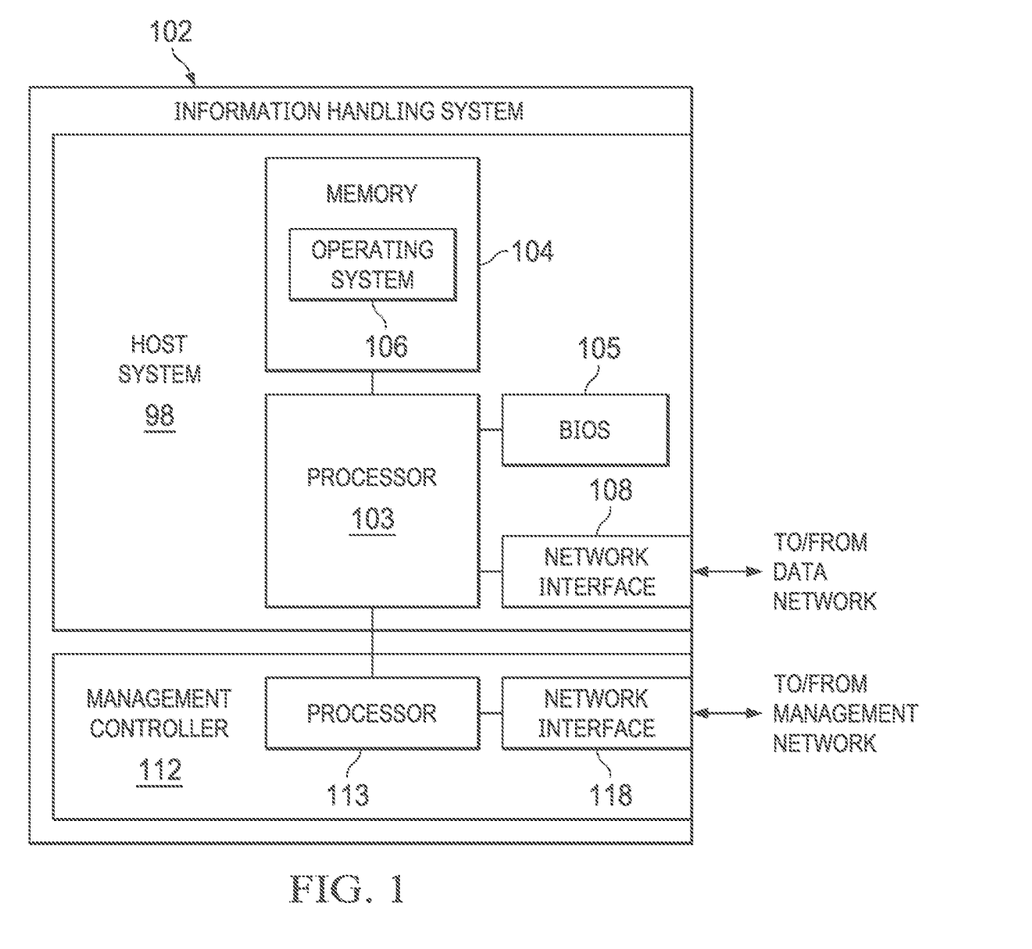
FIG. 1 illustrates a block diagram of an example information handling system, in accordance with embodiments of the present disclosure.
Figure 2:
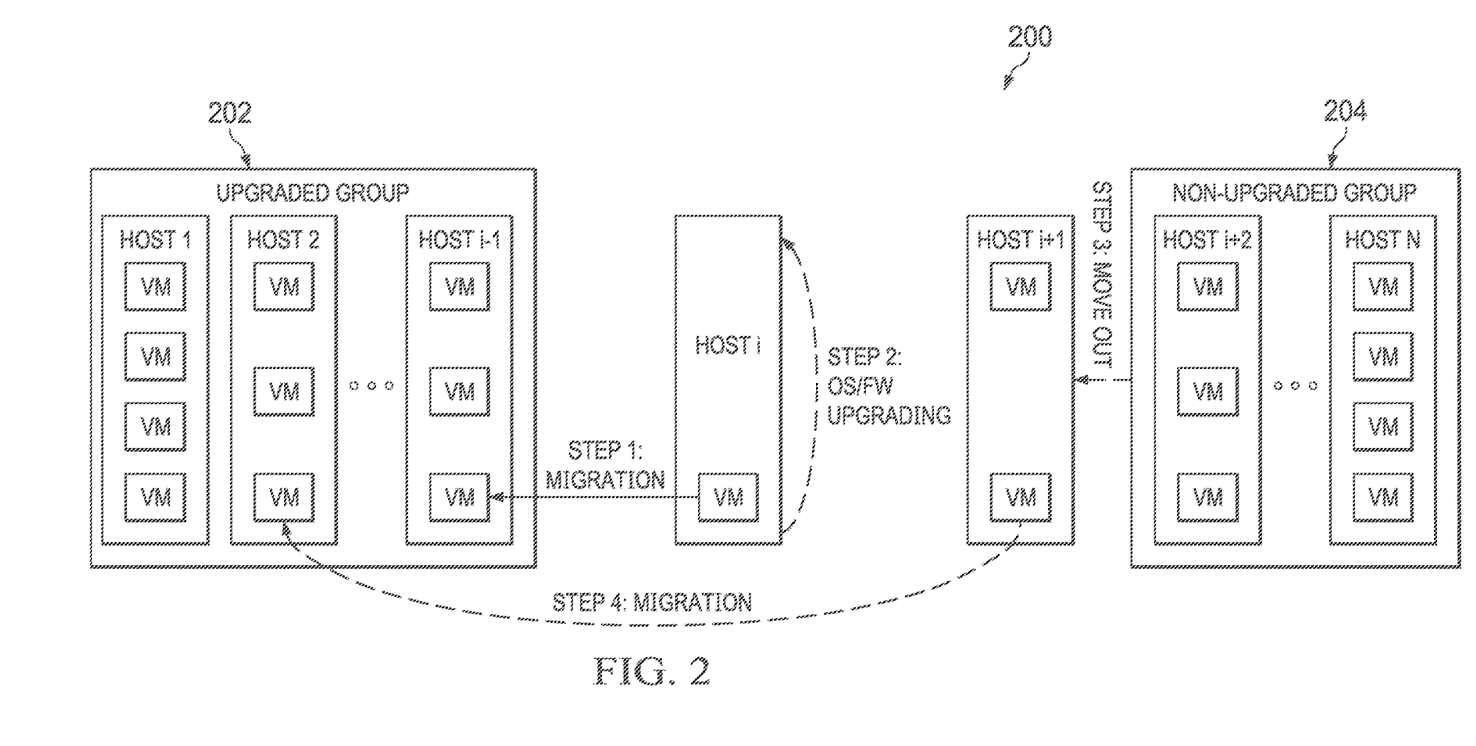
FIG. 2 illustrates a block diagram of an example cluster upgrade event, in accordance with embodiments of the present disclosure.
Figure 3:
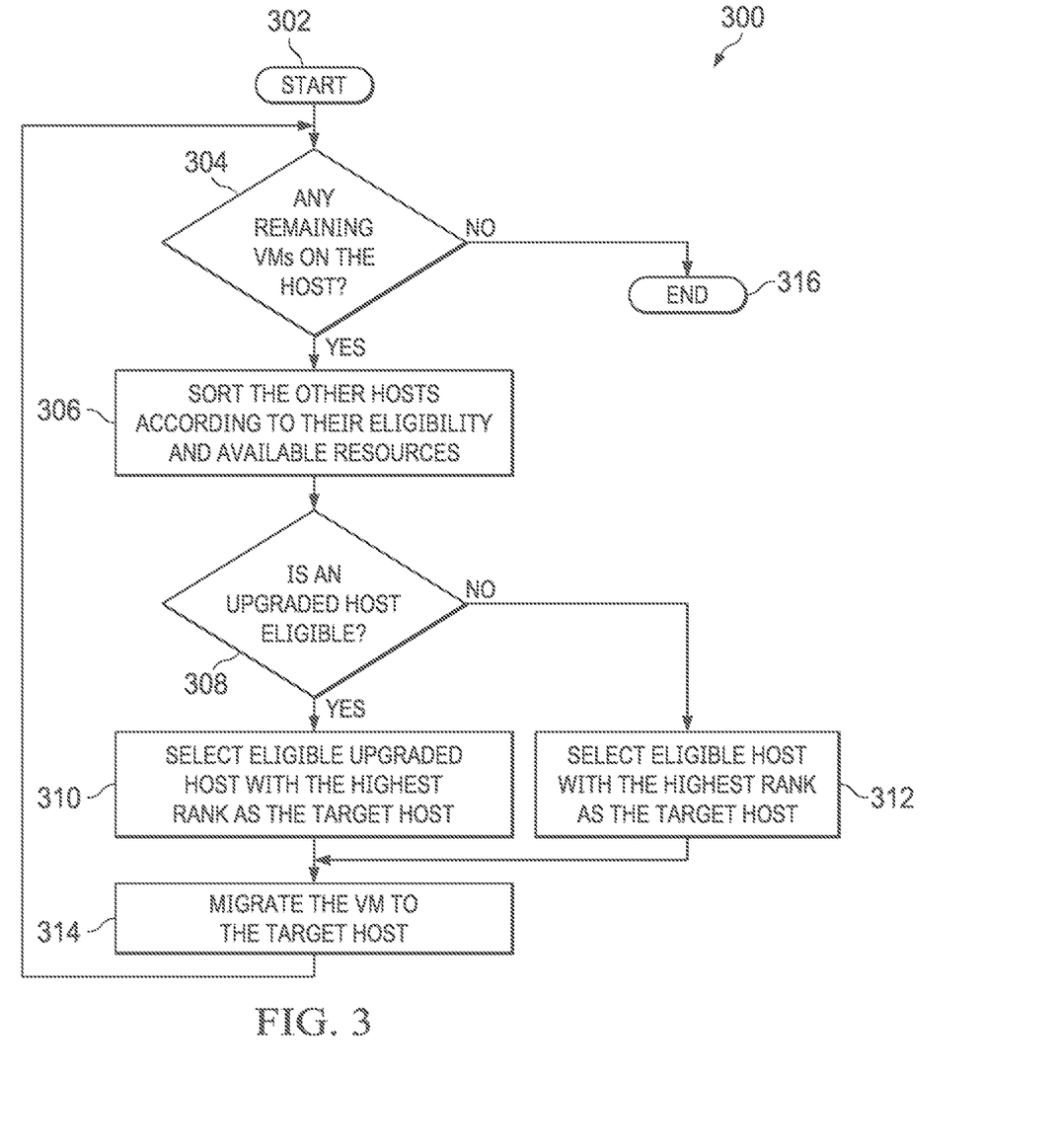
FIG. 3 illustrates an example process flow, in accordance with embodiments of the present disclosure.

Preferred embodiments and their advantages are best understood by reference to FIGS. 1 through 3, wherein like numbers are used to indicate like and corresponding parts.

For the purposes of this disclosure, the term "information handling system" may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For purposes of this disclosure, when two or more elements are referred to as "coupled" to one another, such term indicates that such two or more elements are in electronic communication or mechanical communication, as applicable, whether connected directly or indirectly, with or without intervening elements.

When two or more elements are referred to as "coupleable" to one another, such term indicates that they are capable of being coupled together.

For the purposes of this disclosure, the term "computer-readable medium" (e.g., transitory or non-transitory computer-readable medium) may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; communications media such as wires, optical fibers, microwaves, radio waves, and other electromagnetic and/or optical carriers; and/or any combination of the foregoing.

For the purposes of this disclosure, the term "information handling resource" may broadly refer to any component system, device, or apparatus of an information handling system, including without limitation processors, service processors, basic input/output systems, buses, memories, I/O devices and/or interfaces, storage resources, network interfaces, motherboards, and/or any other components and/or elements of an information handling system.

For the purposes of this disclosure, the term "management controller" may broadly refer to an information handling system that provides management functionality (typically out-of-band management functionality) to one or more other information handling systems. In some embodiments, a management controller may be (or may be an integral part of) a service processor, a baseboard management controller (BMC), a chassis management controller (CMC), or a remote access controller (e.g., a Dell Remote Access Controller (DRAC) or Integrated Dell Remote Access Controller (iDRAC)).

FIG. 1 illustrates a block diagram of an example information handling system 102, in accordance with embodiments of the present disclosure. In some embodiments, information handling system 102 may comprise a server chassis configured to house a plurality of servers or "blades." In other embodiments, information handling system 102 may comprise a personal computer (e.g., a desktop computer, laptop computer, mobile computer, and/or notebook computer). In yet other embodiments, information handling system 102 may comprise a storage enclosure configured to house a plurality of physical disk drives and/or other computer-readable media for storing data (which may generally be referred to as "physical storage resources"). As shown in FIG. 1, information handling system 102 may comprise a processor 103, a memory 104 communicatively coupled to processor 103, a BIOS 105 (e.g., a UEFI BIOS) communicatively coupled to processor 103, a network interface 108 communicatively coupled to processor 103, and a management controller 112 communicatively coupled to processor 103.

In operation, processor 103, memory 104, BIOS 105, and network interface 108 may comprise at least a portion of a host system 98 of information handling system 102. In addition to the elements explicitly shown and described, information handling system 102 may include one or more other information handling resources.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

As shown in FIG. 1, memory 104 may have stored thereon an operating system 106. Operating system 106 may comprise any program of executable instructions (or aggregation of programs of executable instructions) configured to manage and/or control the allocation and usage of hardware resources such as memory, processor time, disk space, and input and output devices, and provide an interface between such hardware resources and application programs hosted by operating system 106. In addition, operating system 106 may include all or a portion of a network stack for network communication via a network interface (e.g., network interface 108 for communication over a data network). Although operating system 106 is shown in FIG. 1 as stored in memory 104, in some embodiments operating system 106 may be stored in storage media accessible to processor 103, and active portions of operating system 106 may be transferred from such storage media to memory 104 for execution by processor 103.

Network interface 108 may comprise one or more suitable systems, apparatuses, or devices operable to serve as an interface between information handling system 102 and one or more other information handling systems via an in-band network. Network interface 108 may enable information handling system 102 to communicate using any suitable transmission protocol and/or standard. In these and other embodiments, network interface 108 may comprise a network interface card, or "NIC." In these and other embodiments, network interface 108 may be enabled as a local area network (LAN)-on-motherboard (LOM) card.

Management controller 112 may be configured to provide management functionality for the management of information handling system 102. Such management may be made by management controller 112 even if information handling system 102 and/or host system 98 are powered off or powered to a standby state. Management controller 112 may include a processor 113, memory, and a network interface 118 separate from and physically isolated from network interface 108.

As shown in FIG. 1, processor 113 of management controller 112 may be communicatively coupled to processor 103. Such coupling may be via a Universal Serial Bus (USB), System Management Bus (SMBus), and/or one or more other communications channels.

Network interface 118 may be coupled to a management network, which may be separate from and physically isolated from the data network as shown. Network interface 118 of management controller 112 may comprise any suitable system, apparatus, or device operable to serve as an interface between management controller 112 and one or more other information handling systems via an out-of-band management network. Network interface 118 may enable management controller 112 to communicate using any suitable transmission protocol and/or standard. In these and other embodiments, network interface 118 may comprise a network interface card, or "NIC." Network interface 118 may be the same type of device as network interface 108, or in other embodiments it may be a device of a different type.

As discussed above, it would be desirable to reduce the amount of time required for performing an LCM event in a cluster of host information handling systems such as information handling system 102. Before each host in an HCI cluster is put into maintenance mode for performing LCM, all of the VMs executing on that host are first migrated to some other host in the cluster. VM migration may result in data migration and later data resynchronization, and so a process that includes fewer VM migrations can significantly reduce the overall time required for LCM.

When one host is entering maintenance mode, all of its VMs will be migrated to another host, which may be either an upgraded host or a non-upgraded host. Thus depending on the order in which hosts go through the maintenance cycle and the destinations to which their VMs are migrated, a given VM might be migrated several times during one LCM operation.

Accordingly, embodiments of this disclosure may decrease the number of VM migrations and shorten the overall migration time during an HCI system upgrade, accelerating the LCM process.

Turning now to FIG. 2, an example cluster 200 is shown. Cluster 200 includes N hosts, and an LCM event is in process. Upgraded group 202 consists of hosts 1 through i−1 that have already entered maintenance mode, received the upgrade, exited maintenance mode, and returned to service. Non-upgraded group 204 consists of hosts i+2 through N that have not yet been upgraded.

The upgrade may proceed in the following steps as illustrated in FIG. 2.

Step 1: Host i may be selected to be upgraded by a node selector service. All VMs of host i are migrated to hosts within upgraded group 202. This is referred to as the migration time window (MT).

Step 2: The OS and/or firmware upgrade proceeds on host i. This is referred to as the upgrade time window (UT).

Step 3: During this time, the next host to be upgraded (host i+1) is selected and moved out of non-upgraded group 204.

Step 4: All VMs of host i+1 begin to be migrated to hosts within upgraded group 202, and its upgrade proceeds along the same lines as that of host i.

When one of the hosts within non-upgraded group 204 is selected to be upgraded, all of the VMs on that host may be migrated to hosts within upgraded group 202. In the ideal case, each VM would be migrated at most once (except the VMs on the first host to be upgraded, which may be migrated twice, because there is no existing upgraded host which can receive them in the first instance). Embodiments attempt to avoid "thrashing" of VM migration during the LCM upgrade (migrating VMs more times than necessary), reducing the overall LCM time.

Turning now to FIG. 3, a flow chart is shown of an example method 300 for migrating VMs, in accordance with some embodiments.

At step 304, the method determines if any VMs remain on the host. If so, then a VM is selected, and at step 306, all hosts other than the host entering maintenance mode are sorted according to their eligibility and available resources. For example, hosts with a large amount of idle processing resources, memory, etc. may be ranked highly. Eligibility refers to whether or not the host is able to accept VM migrations. For example, a host that is in maintenance mode is ineligible.

At step 308, the method determines whether any hosts that have already been upgraded are eligible. If so, then at step 310, the eligible upgraded host with the highest rank is selected as the target host. If not, then at step 312, the eligible host with the highest rank is selected as the target host.

At step 314, the VM is migrated to the target host. The method may loop as shown until all VMs are migrated. Once all VMs are migrated, the method ends at step 316.

One of ordinary skill in the art with the benefit of this disclosure will understand that the preferred initialization point for the method depicted in FIG. 3 and the order of the steps comprising that method may depend on the implementation chosen. In these and other embodiments, this method may be implemented as hardware, firmware, software, applications, functions, libraries, or other instructions. Further, although FIG. 3 discloses a particular number of steps to be taken with respect to the disclosed method, the method may be executed with greater or fewer steps than depicted. The method may be implemented using any of the various components disclosed herein (such as the components of FIG. 1), and/or any other system operable to implement the method.

To represent the expected number of VM migrations, we may define the cluster migration number (CMN) as follows. If hosts are upgraded in a random order, then:

$$CMN = C + \Sigma_{i=1}^{n} R_i * VM_i,$$

where n is the total number of hosts, $VM_i$ is the number of VMs on host i, C is the number of VMs on the first host, and $R_i$ is a random value greater than 1 representing the number of times that the i'th VM needs to be migrated.

According to embodiments of the present disclosure, an improved value for CMN may be obtained, which is less than or equal to the previous expression:

$$CMN = C + \Sigma_{i=1}^{n} VM_i$$

Further, according to some embodiments, steps 2 through 4 mentioned above may execute concurrently in the same time window. Thus the upgrade process may be executed in a pipelined fashion, further reducing the total cluster upgrade time.

That is, in existing implementations in which one host performs both VM migration and OS/firmware upgrades to completion before the next host begins, the total cluster upgrade time (CUT) may be given by:

$$CUT = \Sigma_{i=1}^{m} MT_i + UT_i,$$

where m is the total number of hosts in the cluster, and MT and UT are as described above, the migration time and upgrade time for the i'th host in the cluster.

According to some embodiments, the upgrade process may be pipelined such that when one host finishes migrating its VMs (e.g., while it is beginning the OS/firmware upgrade process), the next host may begin migrating its VMs. Thus the upgrade time for a previous cluster may overlap with the migration time for the next, and the total CUT may be decreased to:

$$CUT = \Sigma_{i=1}^{m} U_i + C,$$

where C is the maximum of the MT values.

According to one embodiment, a node selection service (e.g., running in a VM on a cluster) may determine the order of nodes to be upgraded. This determination may be made by computing a score for each node (e.g., according to the factors discussed below). Then at each step, the node with the highest (or lowest in some embodiments) score may be upgraded in order to optimize the total upgrade time. The node selection service may evaluate all non-upgraded nodes each time when selecting a node to upgrade.

Table 1 below provides an example set of factors and weightings that may be used in some embodiments to determine a node's score. In general, any desired hardware and/or software and/or firmware metrics may be incorporated into the scoring system employed in a given implementation.

TABLE 1

| Factors | Score types | Score | Weight Factor | Comments |
|---|---|---|---|---|
| Network bandwidth | 20 GB-100 GB<br>1 GB-10 GB<br><=1 Gb | 150<br>GB*10<br>5 | 1 | Dedicated migration network and/or shared network |
| CPU | Core Number (CN)<br>Core performance (GHz) | CPU core number*2<br>CPU frequency (GHz)*1 | 0.5 | The core number score and core performance score may be added together |
| Memory | Memory size (GB)*1 | | −0.8 | The more memory size of VM is used, the longer migration time will take. They are inversely correlated |
| Cache Disk | Cache disk size (GB)*0.2 | | −0.2 | The larger the cache disk capacity, the longer migration time will take. They are inversely correlated |
| Configurable 3rd party metric | Depends on metric baseline | | 1 | User input |

Table 2 below provides an example calculation for a cluster of 8 nodes according to the factors laid out in Table 1.

TABLE 2

| | Network score | CPU score | Memory Score | Cache Disk score | Final Score |
|---|---|---|---|---|---|
| Node 1(network: 25 GB, CPU: 16Core, 4 GHz, Memory: 100 GB, Cache Disk: 1 TB) | 150 | 16*2*0.5 + 4*1*0.5 | −0.8*100 | −0.2*0.2*1000 | 48 |
| Node 2(network: 25 GB, CPU: 16Core, 4 GHz, Memory: 80 GB, Cache Disk: 800 GB) | 150 | 16*2*0.5 + 4*1*0.5 | −0.8*80 | −0.2*0.2*800 | 72 |
| Node 3(network: 25 GB, CPU: 16Core, 4 GHz, Memory: 60 GB, Cache Disk: 600 GB) | 150 | 16*2*0.5 + 4*1*0.5 | −0.8*60 | −0.2*0.2*600 | 96 |

TABLE 2-continued

|  | Network score | CPU score | Memory Score | Cache Disk score | Final Score |
|---|---|---|---|---|---|
| Node 4(network: 10 GB, CPU: 12Core, 4 GHz, Memory: 80 GB, Cache Disk: 800 GB) | 10*10 | 12*2*0.5 + 4*1*0.5 | −0.8*80 | −0.2*0.2*800 | 16 |
| Node 5(network: 10 GB, CPU: 12Core, 4 GHz, Memory: 60 GB, Cache Disk: 600 GB) | 10*10 | 12*2*0.5 + 4*1*0.5 | −0.8*60 | −0.2*0.2*600 | 42 |
| Node 6(network: 10 GB, CPU: 12Core, 4 GHz, Memory: 40 GB, Cache Disk: 400 GB) | 10*10 | 12*2*0.5 + 4*1*0.5 | −0.8*40 | −0.2*0.2*400 | 66 |
| Node 7(network: 1 GB, CPU: 12Core, 4 GHz, Memory: 60 GB, Cache Disk: 600 GB) | 5 | 12*2*0.5 + 4*1*0.5 | −0.8*60 | −0.2*0.2*600 | −45 |
| Node 8(network: 1 GB, CPU: 12Core, 4 GHz, Memory: 40 GB, Cache Disk: 400 GB) | 5 | 12*2*0.5 + 4*1*0.5 | −0.8*40 | −0.2*0.2*400 | −21 |

In this example, Node 3 has the highest score, and so it will be the first node to upgrade. Its VMs may be migrated to other nodes, and when it enters OS/firmware upgrading phase, the node selection service will recalculate scores for the other nodes and select the next node. Then the VMs of the next node will begin to be migrated while Node 3 is being upgraded. When Node 3 is upgraded, it may be put into the upgraded group, and VMs on future nodes being upgraded may be migrated to Node 3.

Accordingly, embodiments of this disclosure may decrease the total number of VM migrations, reducing the overall time for cluster upgrades. Pipelining as described herein may further reduce the overall time for cluster upgrades.

This disclosure encompasses all changes, substitutions, variations, alterations, and modifications to the exemplary embodiments herein that a person having ordinary skill in the art would comprehend. Similarly, where appropriate, the appended claims encompass all changes, substitutions, variations, alterations, and modifications to the exemplary embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

Further, reciting in the appended claims that a structure is "configured to" or "operable to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke § 112(f) during prosecution, Applicant will recite claim elements using the "means for [performing a function]" construct.

All examples and conditional language recited herein are intended for pedagogical objects to aid the reader in understanding the invention and the concepts contributed by the inventor to furthering the art, and are construed as being without limitation to such specifically recited examples and conditions. Although embodiments of the present inventions have been described in detail, it should be understood that various changes, substitutions, and alterations could be made hereto without departing from the spirit and scope of the disclosure.

What is claimed is:

1. An information handling system comprising:
   at least one processor; and
   a memory;
   wherein the information handling system is configured to perform an upgrade of a plurality of hosts of an information handling system cluster by:
   determining a score for each host based on hardware metrics of each host, wherein the score is determined as a weighted sum of component scores including a network bandwidth component score, a central processing unit (CPU) performance component score, a memory size component score, and a cache disk component score;
   based on the determined scores, selecting a first host for upgrading;
   migrating virtual machines from the first host to one or more other hosts; and
   causing the first host to perform the upgrade.

2. The information handling system of claim 1, wherein the cluster is a hyper-converged infrastructure (HCI) cluster.

3. The information handling system of claim 1, wherein the information handling system is a particular host of the cluster.

4. The information handling system of claim 3, wherein the determining and the selecting are performing by a virtual machine executing on the particular host.

5. The information handling system of claim 1, further configured to:
   determine a revised score for each of a plurality of un-upgraded hosts based on the hardware metrics;
   based on the revised scores, select a second host for upgrading; and
   while the first host is performing the upgrade, migrate virtual machines from the second host to one or more other hosts.

6. The information handling system of claim 1, wherein the upgrade comprises an upgrade of an operating system and at least one firmware component.

7. A computer-implemented method for performing an upgrade of a plurality of hosts of an information handling system cluster, the method comprising:
   determining a score for each host based on hardware metrics of each host, wherein the score is determined as a weighted sum of component scores including a network bandwidth component score, a central processing unit (CPU) performance component score, a memory size component score, and a cache disk component score;
   based on the determined scores, selecting a first host for upgrading;
   migrating virtual machines from the first host to one or more other hosts; and
   causing the first host to perform the upgrade.

8. The method of claim 7, wherein the scores are determined such that a total number of virtual machine migrations occurring during the upgrade is minimized.

9. The method of claim 7, wherein the information handling system is a particular host of the cluster.

10. The method of claim 9, wherein the determining and the selecting are performing by a virtual machine executing on the particular host.

11. The method of claim 7, further comprising:
   determining a revised score for each of a plurality of un-upgraded hosts based on the hardware metrics;
   based on the revised scores, selecting a second host for upgrading; and
   while the first host is performing the upgrade, migrating virtual machines from the second host to one or more other hosts.

12. The method of claim 7, wherein the upgrade comprises an upgrade of an operating system and at least one firmware component.

13. An article of manufacture comprising a non-transitory, computer-readable medium having computer-executable instructions thereon that are executable by a processor of an information handling system for performing an upgrade of a plurality of hosts of an information handling system cluster by:
   determining a score for each host based on hardware metrics of each host, wherein the score is determined as a weighted sum of component scores including a network bandwidth component score, a central processing unit (CPU) performance component score, a memory size component score, and a cache disk component score;
   based on the determined scores, selecting a first host for upgrading;
   migrating virtual machines from the first host to one or more other hosts; and
   causing the first host to perform the upgrade.

14. The article of claim 13, wherein the cluster is a hyper-converged infrastructure (HCI) cluster.

15. The article of claim 13, wherein the information handling system is a particular host of the cluster.

16. The article of claim 15, wherein the determining and the selecting are performing by a virtual machine executing on the particular host.

17. The article of claim 13, the instructions further executable for:
   determining a revised score for each of a plurality of un-upgraded hosts based on the hardware metrics;
   based on the revised scores, selecting a second host for upgrading; and
   while the first host is performing the upgrade, migrating virtual machines from the second host to one or more other hosts.

18. The article of claim 13, wherein the upgrade comprises an upgrade of an operating system and at least one firmware component.

19. The information handling system of claim 1, wherein the component scores further include an additional component score that is configurable by a user.

20. The method of claim 7, wherein the component scores further include an additional component score that is configurable by a user.

* * * * *

UNITED STATES PATENT AND TRADEMARK OFFICE
CERTIFICATE OF CORRECTION

| | | |
|---|---|---|
| PATENT NO. | : 12,093,718 B2 | |
| APPLICATION NO. | : 17/719643 | |
| DATED | : September 17, 2024 | |
| INVENTOR(S) | : Gu et al. | |

It is certified that error appears in the above-identified patent and that said Letters Patent is hereby corrected as shown below:

In the Specification

In Column 8, Line 1, delete "$CUT=\sum_{i=1}^{m} U_i + C$," and insert

-- $CUT = \sum_{i=1}^{m} UT_i + C$, --, therefor.

Signed and Sealed this
Twenty-second Day of October, 2024

Katherine Kelly Vidal
*Director of the United States Patent and Trademark Office*